July 17, 1951 E. W. HALL Re. 23,391

ROTARY ABRADING TOOL

Original Filed March 6, 1946 4 Sheets-Sheet 1

Inventor:
Elisha W. Hall.
by Emery, Booth, Townsend, Miller & Wisner Attys

ROTARY ABRADING TOOL

Original Filed March 6, 1946 4 Sheets-Sheet 2

Inventor:
Elisha W. Hall,
by Emery, Booth, Townsend,
Miller & Weidner Attys

ROTARY ABRADING TOOL

Original Filed March 6, 1946 4 Sheets-Sheet 3

Inventor:
Elisha W. Hall,
by Emery, Booth, Townsend, Miller & Wheldon Attys

ROTARY ABRADING TOOL

Original Filed March 6, 1946 4 Sheets-Sheet 4

Inventor:
Elisha W. Hall,
by Emery, Booth, Townsend,
Miller & Brisebois Attys

Reissued July 17, 1951

Re. 23,391

UNITED STATES PATENT OFFICE 23,391

ROTARY ABRADING TOOL

Elisha W. Hall, Scituate, Mass.

Original No. 2,462,741, dated February 22, 1949, Serial No. 652,263, March 6, 1946. Application for reissue August 1, 1950, Serial No. 177,109

12 Claims. (Cl. 51—193)

Matter enclosed in heavy brackets [ ] appears in the original patent but forms no part of this reissue specification; matter printed in italics indicates the additions made by reissue.

This invention relates to rotary abrading tools of the class in which the abrading material (either a continuous ring or a plurality of distinct abrading elements) is mounted on a hub which is constructed and arranged to permit removal of the abrading material when too greatly worn for further use, and replacement by other abrading material. The invention is more particularly concerned with a novel and improved construction ensuring safe confinement and retention of the abrading material when in use, while permitting rapid and convenient disassembly when the abrading material is to be replaced. The invention is also concerned with a novel relative arrangement of the abrading material and the hub to give to the latter a conformation which will produce an axial wiping action to minimize grooving of the work. These and other features will appear during the course of the following description when taken in connection with certain embodiments of the invention, while its scope will be pointed out more particularly in the appended claims.

Figure 2:
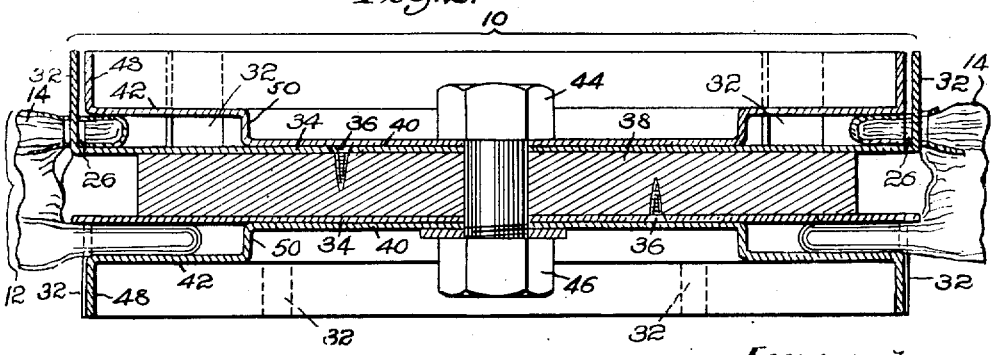
Fig. 2 is a sectional view on an enlarged scale on line 2—2 of Fig. 1.

Referring to the drawings and to the embodiments of the invention illustrated therein as examples, and having reference at first to Fig. 2, there is shown a rotary abrading wheel comprising a hub 10, and a mass of abrading material 12, attached to the hub in a novel manner presently to be described. In the present example, this mass of abrading material, instead of being in the nature of a continuous ring [which it might well be] *as in the example illustrated in Figs. 10–12 hereinafter described,* is in the nature of an annular series of distinct bodies or elements 14, separately attached to the hub.

Figure 7:
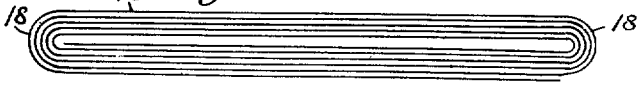
Fig. 7 is an edgewise view illustrating one manner of building up the required thickness of abrading material from a strip of cloth of indefinite length.

While the abrading material might be a single thickness of textile material of considerable thickness, and there are such materials available commercially, in the present example it is convenient to employ bias-cut, cotton cloth in the form of a strip 16 of indefinite length built up to the required thickness as by being first wound in a drum and then flattened (see Fig. 7) to provide a considerable number of plies (sixteen, for example) with folds 18 at each end of the multiply mass. This mass may be shaped as desired, and in the present example its corners are angularly chamfered as at 20, and notched as at 22, and perforated as at 24 to reduce the bulk at these points.

Figure 1:
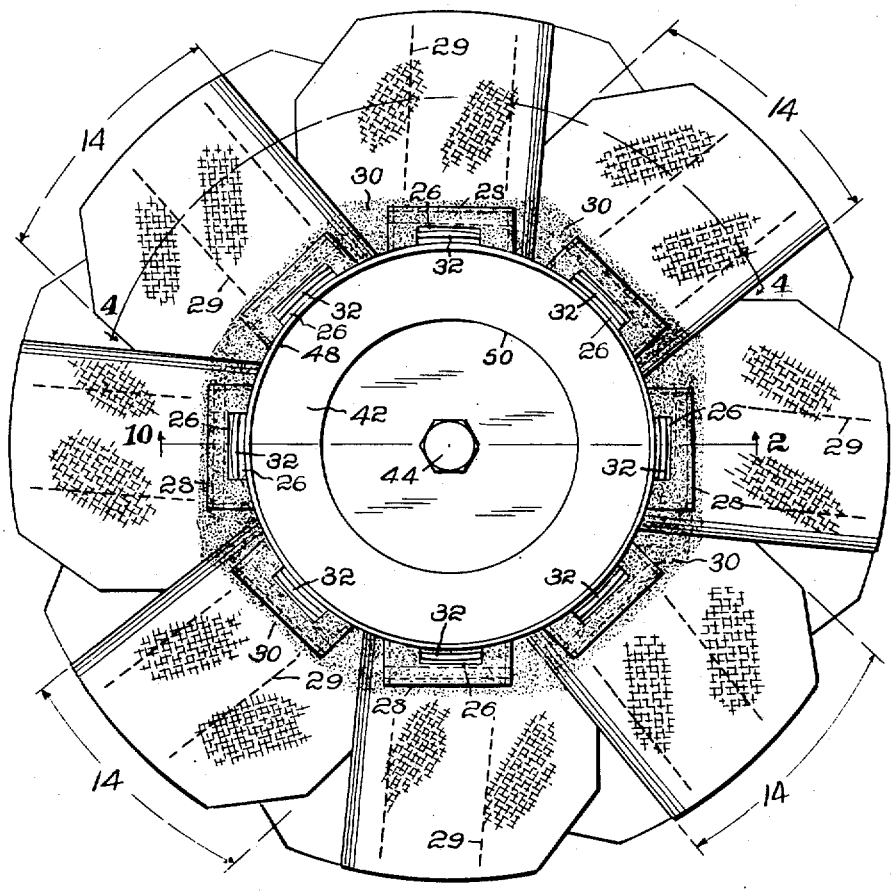
Fig. 1 is an elevation of a rotary abrading wheel embodying the invention.
Figure 6:
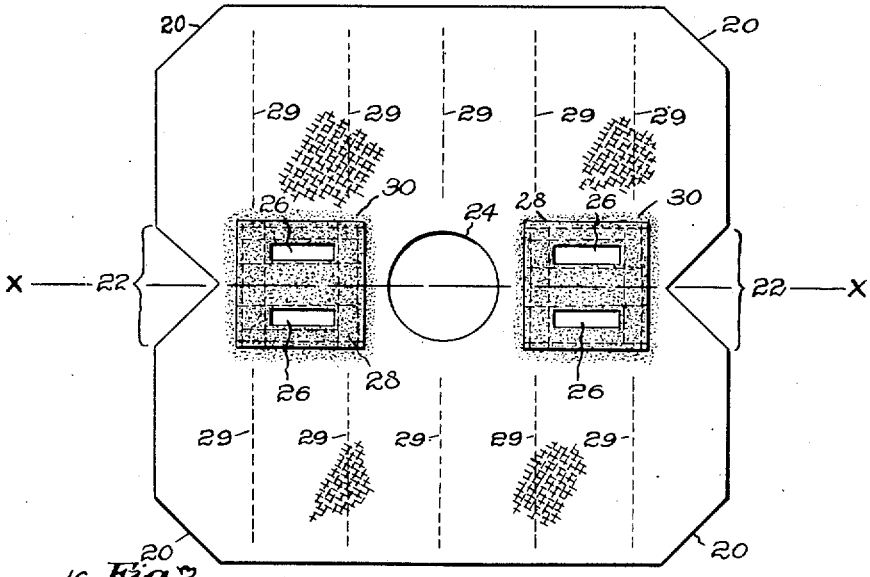
Fig. 6 is an elevation of one of the abrading elements removed from the hub and unfolded to display its form.

To prepare these multi-ply abrading elements 14 for attachment to the hub 10, each is provided with a plurality of slots 26, for example two pairs of such slots, preferably reinforced as by patches 28, also slotted in like manner and stitched in place. These patches or reinforcements may be, for example, relatively heavy, strong material such as canvas or duck which imparts great strength to the abrading material at its points of attachment to the hub 10. It is desirable, though not necessary, to unite the cloth plies (see Fig. 6) with rows of stitches 29 which in this example are in lines which (see Fig. 1) are disposed radially. These stitches prevent separation of the plies and lend firmness to the abrading element.

To prepare the described abrading element for attachment to a hub such as the one presently to be described, according to the embodiment now under consideration, the multi-ply mass is folded along a median line x—x (see Fig. 6) which bisects the notches 22 and the aperture 24 and lies midway between slots 26 of each pair, with the result that the slots of each pair then coincide, the notches 22 become chamfers, and the aperture 24 becomes a notch in the now folded mass.

Figure 8:
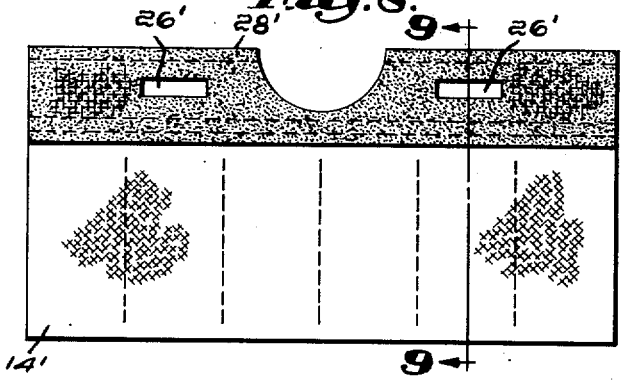
Fig. 8 is an elevation *on a smaller scale* of a modified abrading element; [and]
Figure 9:
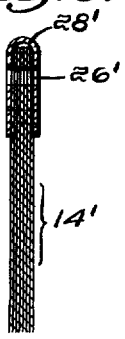
Fig. 9 is a sectional view on line 9—9 of Fig. 8.

According to the modification shown in Fig. 8, instead of employing a fold such as that just described, a narrower strip is employed, wound and flattened as before, *to provide a section 14'* but having only two slots 26'. In this form there is a reinforcement 28′ folded over the adjacent edges of the plies so as to embrace them, and stitched in place as before.

To make the material about the slots compact, and to reduce friction between the fabric and the hub 10, that local area about the slots is next treated with suitable material such as paraffin 30, applied hot, or suitable plastic compound such as urea formaldehyde, a cold setting resin glue which will penetrate the fibers, and when subjected to pressure by squeezing in a press, the material is compacted and reduced in bulk so as to be introduced readily into a small space in the hub 10. The binder also tends to maintain the folded condition of the abrading element.

Figure 4:
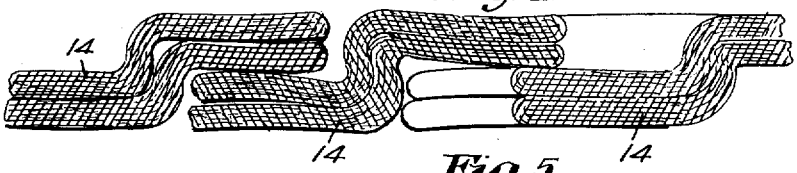
Fig. 4 is a sectional view on line 4—4 of Fig. 1.
Figure 5:
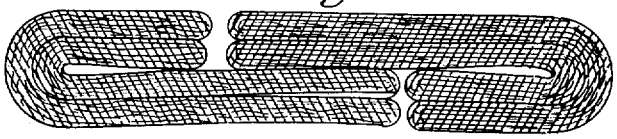
Fig. 5 is a modification of the arrangement shown in Fig. 4.

Several such abrading elements may be attached to an appropriate hub such as that now to be described, and one or more, usually several, of these hubs placed coaxially on an arbor. One hub which serves the purpose particularly well comprises two sets of holders such as lugs 32 on plates 34 (see Fig. 2), the lugs on one plate being staggered, i. e., alternating with the lugs on the other plate so that when a lug 32 on one plate is introduced through one pair of slots 26 and the next lug 32 on the other plate is introduced through the other pair of slots 26, a peculiar and desirable formation of the abrading element results. One such formation is illustrated in Fig. 4 and is characterized by a reverse curve or S curve, while another formation is illustrated in Fig. 5, and is characterized by a U curve. *By comparing Fig. 1 with Fig. 6, which is on substantially the same scale, it will be seen that successive lugs 32 at opposite sides of the hub are nearer together than the distance between slots 26. Therefore when the element 14 is put in position as seen in Fig. 4 its intermediate portion extends in an indirect path between the lugs and forms a pleat or fold and the central portion will extend substantially axially (vertically viewing Fig. 4) as best seen in that figure but also in Fig. 2. The results are similar in the case of Fig. 5.* Each formation has advantages when in use, particularly a wiping action in an axial direction, tending to minimize grooving of the work. Each of these formations is possible by the use of the staggered arrangement of the lugs. To maintain this staggered arrangement, the plates 34 are suitably secured together for relative non-rotation, as, for example, by securing them by screws 36 to a central disk 38 which may be wood, laminated or otherwise.

In the present embodiment, the lugs 32 of one plate 34 have their free ends extending in an opposite direction to the lugs of the other plate. It is preferred not to rely upon the lugs 32 alone to prevent accidental detachment of the abrading elements from the hub, even though the staggered arrangement and the folds of the abrading elements tend to prevent such detachment. Instead of relying wholly upon these arrangements, I prefer to employ means positively to lock the abrading elements in place on the lugs. One such means will now be described, reference being had to Fig. 2. This particular retaining means involves simply associating with each plate 34 another plate 40 having a marginal portion 42 which overlies the several abrading elements. When several assemblies such as the one shown in Fig. 2 are placed coaxially on an arbor and secured thereon by the usual clamping plates and nut threaded upon the arbor, the retaining plates prevent accidental disengagement of the abrading elements from the lugs. However, before the assembly is placed uopn the arbor, it may be desirable to hold the assembly together, temporarily, as by a bolt 44 having a nut 46.

Figure 3:
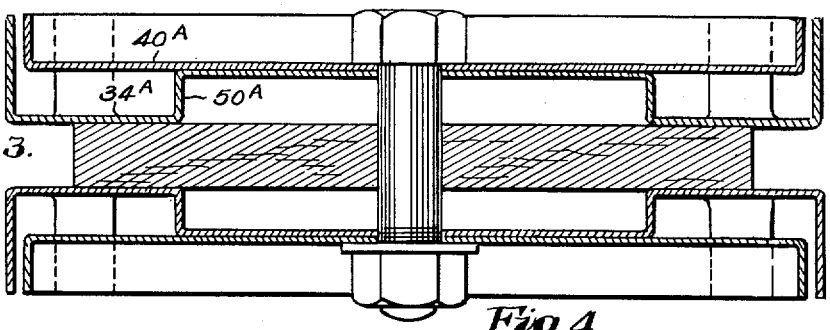
Fig. 3 is a sectional view similar to Fig. 2, showing a modification.

The retaining plate 40 may take the form shown in Fig. 2 with a circumferential flange or lip 48 and with an offset 50 which constitutes a spacer preventing the margin 42 from unduly restraining the abrading elements 14, or it may take the form shown in Fig. 3 in which there is a plate 40A which has no offset but instead the plate 34A has an offset 50A which constitutes a spacer. Some sort of spacer is desirable though perhaps not necessary, as without the spacer the retaining plate would then be unrestrained and would clamp the abrading elements firmly to the plates having the lugs.

Figure 10:
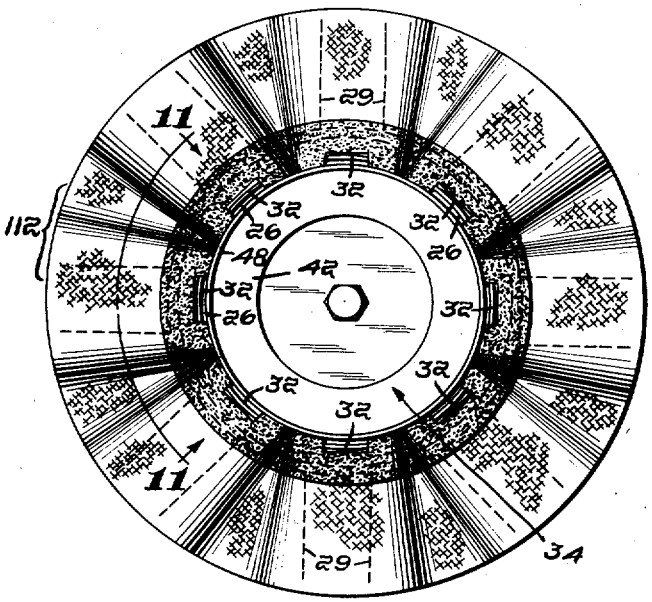
*Fig. 10 is a view similar to Fig. 1 showing the abrading material in the form of a continuous ring;*
Figure 11:
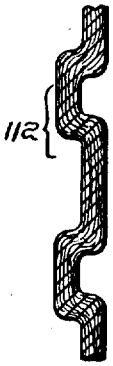
*Fig. 11 is a section on line 11—11 of Fig. 10; and*
Figure 12:
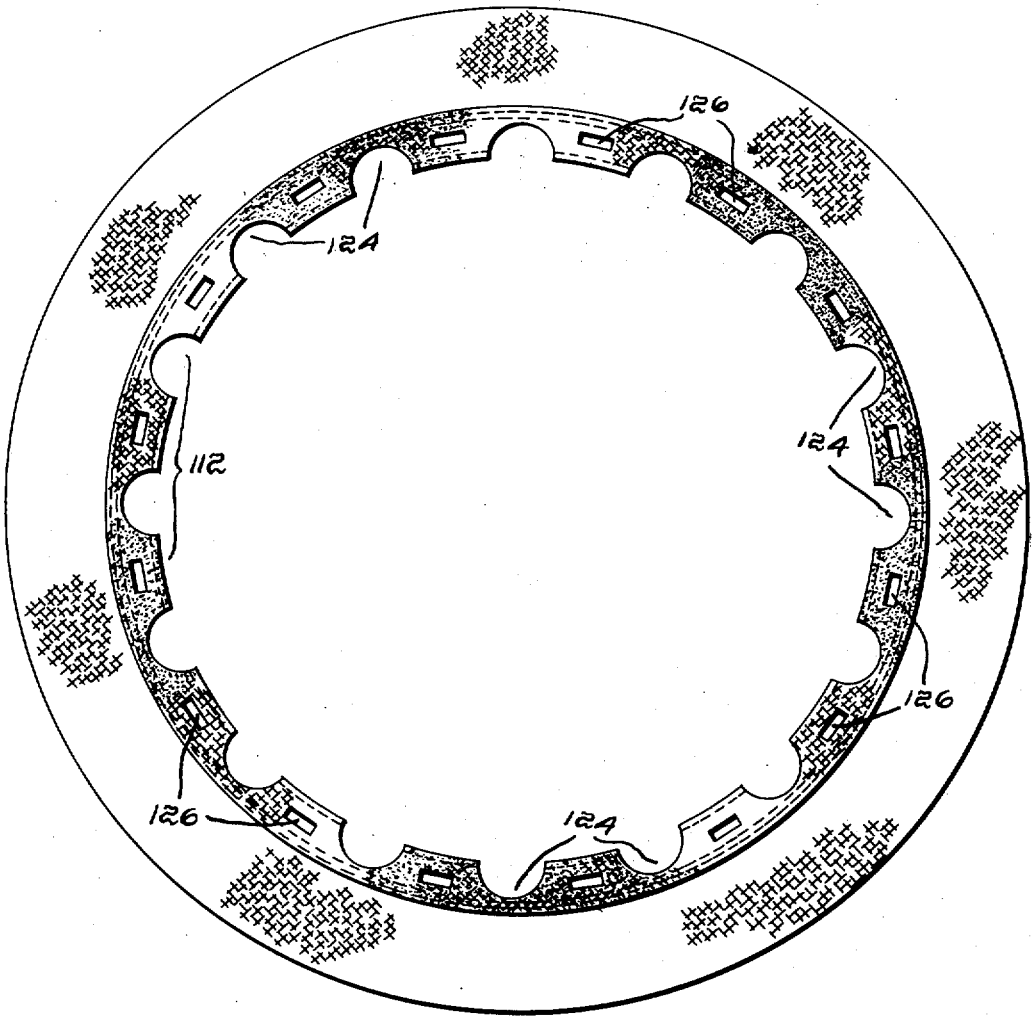
*Fig. 12 is an elevation of the ring of abrading material as used in Fig. 11. The scale is different from that of Fig. 10.*

*Referring now to Figs. 10 through 12 there is there shown a mass of abrading material 112 in the form of a continuous ring. The supporting disk for the abrading material comprises a hub 12 and the plates 34 with lugs 32 as in the previous examples. The mass of abrading material 112, as best seen in Fig. 12, forms an annulus which in a certain sense resembles elements similar to those shown in Fig. 8 united end to end, and it presents along its inner circumference cut away portions 124 defining between them attaching extensions or tabs in which are formed, remote from the inner boundaries of these extensions, openings 126 adapted to be engaged over the lugs 32. The number of openings may be equal to the number of lugs on both faces of the disk. The internal circumference of the ring is substantially longer than the circumference of the supporting disk on which it is mounted. Thus an eyelet opening 126 may be engaged over one lug 32 and the next over a disaligned lug on the opposite side, the ring crossing the edge of the disk between the lugs with the edge of the disk entering the cut away portion 124 between the two openings, and so on throughout the circumference of the disk until all the openings have been engaged with the lugs of the supporting disk. The ring is thus gathered up into successive substantially radial pleats reducing its effective inner circumference to that of the disk, portions of the pleats crossing over the edge of the disk and being disposed substantially axially of the disk as best seen in Fig. 11, which may be compared with Fig. 4. The indirect path taken by the abrading material between successive lugs causes the intermediate portions between successive openings to assume this pleated arrangement, the ring taking on a more or less sinuous form embodying successive reversely curved or S-shaped formations.*

Having thus described these embodiments of the invention, what I claim is:

[1. In a rotary abrading tool, the combination of a hub having two sets of lugs, the lugs of one set alternating with the lugs of the other set, and the lugs of one set having free ends extending in a direction opposite to those of the other set, and a circumferential mass of abrading material having alternate openings receiving alternate lugs.]

[2. In a rotary abrading tool, the combination of two circumferential sets of holders, the holders of one set alternating with and being displaced axially with relation to the holders of the other set, each set having free ends extending in a direction opposite to those of the other set, and abrading material held by the holders of both sets and extending lengthwise of the axis from one set to the other.

[3. In a rotary abrading tool, the combination of two circumferential sets of holders, the holders of one set being displaced axially with relation to and alternating with the holders of the other set, each set having free ends extending in a direction opposite to those of the other set, and a circumferential set of abrading elements, each held in part by a holder of one set, extending lengthwise of the axis of rotation, and each being held in part by the next succeeding holder of the other set.]

[4. In a rotary abrading tool, the combination of two circumferential sets of holders, the holders of one set being displaced axially with relation to and alternating with the holders of the other set, and a circumferential set of abrading elements, each held in part by a holder of one set having a curved offset formation extending lengthwise of the axis of rotation, and each being held in part by the next succeeding holder of the other set.]

[5. In a rotary abrading tool, the combination of two circumferential sets of holders, the holders of one set being displaced axially with relation to the holders of the other set, and a circumferential set of abrading elements each held in part by the holders of one set and in part by the holders of the other set, and each having an intermediate offset portion displaced lengthwise of the axis.]

[6. In a rotary abrading tool, the combination of two circumferential sets of holders, the holders of one set having free ends extending in a direction opposite to those of the second set and displaced axially with relation to and staggered with relation to the holders of the second set, and a set of abrading elements each having two openings, one opening receiving a lug of one set and the other opening receiving a lug of the other set, and each abrading element having a portion offset intermediate its openings and displaced lengthwise of the axis.]

[7. In a rotary abrading tool, the combination of a hub having two sets of lugs extending lengthwise of the axis of rotation, the lugs of one set being displaced axially with relation to and staggered with relation to the holders of the second set, one set having free ends extending in the opposite direction to those of the other set, and a set of abrading elements, each having two openings, one receiving a lug of one set and extending thence lengthwise of the axis of rotation to and receiving a lug of the other set.]

*8. In a structure of the class described, a central disk support of narrow width, spaced studs adjacent the periphery of said support extending outwardly a short distance therefrom, a plurality of buffs around said central support and extending outwardly therefrom, said buffs consisting of a plurality of superimposed fabric sheets folded along substantially a median line extending between opposite inner and outer sides of the sheets and said buffs at said median line of folding and substantially between their ends being cut at right angles to said line of folding for the passage of the periphery of said central disk support, each of said buffs having a portion located at one side of the central support and crossing thereover generally transversely of and beyond the edges of the disk, the remaining portions of the buff being located at the opposite sides of the disks, said buffs having openings properly positioned for studs at opposite sides of the support to be passed therethrough, said openings through which the studs pass being located one at each side of the cut therein provided for the periphery of the central disk support to extend through partially into the bodies of the buffs, and outer clamping plates releasably connected one at each side of the disk and overlying at least in part the portions of the buffs which are located at th esides of the disks in close proximity to the outer ends of the studs to retain the buffs on the latter.*

*9. In a buffing wheel, a central disk-like support, spaced studs around said support adjacent its periphery and at either side thereof extending outwardly at right angles to the plane thereof, buffs of fabric each having a straight inner side, said buffs at the straight inner sides being cut outwardly substantially midway between the ends of said straight sides a distance less than the outward dimension of said buff and each of said buffs folded substantially on a line coincident with and an extension of the line of said cut, and each of said buffs at the corners between said cut and said straight side having an opening therethrough, said buffs being located around the peripheral portions of said support and crossing it at the folds thereof outwardly of said cuts, with studs at opposite sides of the support seating in the openings of each buff, and means releasably connected with the disk overlying portions of the buffs adjacent the free ends of said studs to retain the buffs thereon.*

*10. In an abrading wheel in combination with a supporting disk having projections adjacent its periphery at either radial face thereof extending outwardly substantially parallel to the axis, abrading material carried by the disk comprising at least one abrading element comprising a number of plies of abrading material, the element having spaced openings at its inner side and being cut away between said openings, successive openings being engaged with projections on opposite sides of the disk, the element crossing the edge of the disk between said projections with the* said edge entering the cut away portion between *the openings, the intermediate portion of the abrading element extending in an indirect path between said points of engagement of the said openings with said projections.*

*11. An abrading wheel comprising a supporting disk having at either radial face an annular series of projections extending outwardly therefrom substantially parallel to the axis of the disk and buffing sections each of which comprises a plurality of plies of fabric mounted on the periphery of the disk to present the edges of the plies to the work at the periphery of the wheel, each section having a cut between its ends extending partly therethrough from its inner side, the cut being positioned over the periphery of the disk with the uncut portions of the plies outwardly of the cut disposed substantially axially of the disk, the ends of the section at opposite sides of the cut being folded into planes substantially parallel to that of the disk with their inner parts overlapping the radial faces of the disk, said parts having openings which are engaged over certain of the projections at opposite radial faces of the disk.*

*12. An abrading wheel as defined in claim 11 wherein the ends of the sections are folded in the same direction to give the section a* U *curve formation.*

*13. An abrading wheel as defined in claim 11 wherein the ends of the sections are folded in opposite directions and engaged with disaligned projections to give the section a reversely curved or* S*-shaped formation.*

*14. In an abrading wheel the combination as*

*defined in claim 10 wherein the projections engaging the element at opposite sides of the disk are disaligned.*

*15. In an abrading wheel the combination as defined in claim 10 wherein the abrading element is an annulus completely surrounding the periphery of the disk.*

*16. In an abrading wheel in combination with a supporting disk having projections adjacent its periphery at either radial face thereof extending substantially parallel to the axis, an abrading element in the form of a ring of flexible abrading material, which ring has a circular series of spaced openings at its inner side and is cut away between said openings, the portion of the ring outward of said cutaway portions being an annulus the inner perimeter of which is substantially longer than the circumference of said disk, successive openings in the element being engaged with disaligned projections on opposite sides of the disk, the annulus crossing the edge of the disk between said projections with said edge entering the cutaway portions between the openings, the annulus being gathered into substantially radial pleats reducing its effective inner circumference to that of the disk.*

*17. An abrading element for mounting on a center to provide an abrading wheel comprising a continuous annular portion of flexible abrading material which is gathered into successive pleats for positioning in encircling relation to a relatively small center with portions of the pleats at the interior crossing the central plane of the center and portions alternating therewith disposed at opposite sides of the plane and attaching extensions from said alternating portions having perforations remote from their inner boundaries parallel to the axis of the element for engagement over securing projections on the center extending outwardly therefrom at opposite sides of that plane.*

*18. An abrading element for mounting on a center to provide an abrading wheel comprising an annular ring of flexible abrading material having projecting from its interior circumference a series of spaced tabs having within their boundaries eyelet openings extending parallel to the axis of the ring by means of which the element can be attached to the center with said tabs brought together in a smaller circumference with resultant gathering of the ring into pleats or folds.*

*19. An abrading element for mounting on a center to provide an abrading wheel, the element having a circular series of spaced eyelet openings adjacent to but spaced from its inner side and being cut away between said openings, the outer portion of the element being a continuous annulus gathered into a series of pleats with a resultant approximation of the openings to lie along a relatively small circumference.*

ELISHA W. HALL.

REFERENCES CITED

The following references are of record in the file of this patent or the original patent:

UNITED STATES PATENTS

| Number | Name | Date |
|---|---|---|
| Re. 19,894 | Myers | Mar. 17, 1936 |
| 269,688 | Levett | Dec. 26, 1882 |
| 872,966 | Painter | Dec. 3, 1907 |
| 968,431 | Stevens | Aug. 23, 1910 |
| 1,141,143 | Radlein et al. | June 1, 1915 |
| 2,017,925 | Siefen | Oct. 22, 1935 |
| 2,060,952 | Springer | Nov. 17, 1936 |
| 2,160,403 | Hicks | May 30, 1939 |
| 2,226,624 | MacFarland et al. | Dec. 31, 1940 |
| 2,226,625 | MacFarland et al. | Dec. 31, 1940 |
| 2,280,399 | Garling | Apr. 21, 1942 |
| 2,355,667 | Melton | Aug. 15, 1944 |